United States Patent
Armstead et al.

(10) Patent No.: US 9,600,432 B2
(45) Date of Patent: Mar. 21, 2017

(54) VERIFYING RUNTIME SWITCH-OVER BETWEEN MULTIPLE I/O PROTOCOLS ON SHARED I/O CONNECTION

(71) Applicant: International Business Machines Corporation, Armonk, NY (US)

(72) Inventors: Thomas M. Armstead, Rochester, MN (US); John H. Klaus, Rochester, MN (US); Paul E. Schardt, Rochester, MN (US); Scott M. Willenborg, Stewartville, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 130 days.

(21) Appl. No.: 14/255,218

(22) Filed: Apr. 17, 2014

(65) Prior Publication Data

US 2015/0301969 A1 Oct. 22, 2015

(51) Int. Cl.
*G06F 13/42* (2006.01)
*G06F 13/40* (2006.01)
*G06F 9/54* (2006.01)

(52) U.S. Cl.
CPC ............ *G06F 13/4022* (2013.01); *G06F 9/54* (2013.01); *G06F 13/4221* (2013.01)

(58) Field of Classification Search
CPC ..... G06F 13/4022; G06F 13/4221; G06F 9/54
See application file for complete search history.

(56) References Cited

U.S. PATENT DOCUMENTS

| 5,265,239 A * | 11/1993 | Ardolino | G06F 13/10 |
| | | | 709/203 |
| 5,546,453 A * | 8/1996 | Hebert | H04L 29/06 |
| | | | 370/469 |
| 5,787,248 A * | 7/1998 | Zupcsics | H04L 41/0226 |
| | | | 709/223 |
| 7,783,788 B1 * | 8/2010 | Quinn | G06F 9/5077 |
| | | | 710/10 |
| 8,085,788 B2 * | 12/2011 | Ohara | H04L 41/082 |
| | | | 370/395.52 |
| 8,169,893 B1 * | 5/2012 | Getker | H04L 45/22 |
| | | | 370/217 |
| 8,576,855 B2 * | 11/2013 | Sorrini | H04L 41/06 |
| | | | 370/395.6 |
| 8,767,694 B2 * | 7/2014 | Yablokov | H04W 12/08 |
| | | | 370/338 |

(Continued)

FOREIGN PATENT DOCUMENTS

CN 102707991 A * 10/2012

*Primary Examiner* — Jing-Yih Shyu
(74) *Attorney, Agent, or Firm* — Patterson + Sheridan, LLP

(57) ABSTRACT

A verification environment enables verification of runtime switch-over—i.e., a switch-over without restarting the device under test—between multiple I/O protocols that share a same physical interface. The device under test can be a switch unit having multiple logical protocol processing units and a logical protocol multiplexor. The verification environment includes a switch-over detector which monitors the state of the device under test, and a switch-over controller that controls the switch-over sequence by pausing and re-starting traffic on all or specific protocol drivers of the verification environment.

13 Claims, 5 Drawing Sheets

(56) References Cited

U.S. PATENT DOCUMENTS

| | | | |
|---|---|---|---|
| 2005/0022056 A1* | 1/2005 | Risi | G06F 11/20 714/13 |
| 2005/0036485 A1* | 2/2005 | Eilers | H04L 41/0663 370/389 |
| 2006/0075126 A1* | 4/2006 | Lehrschall | H04L 29/06027 709/229 |
| 2007/0260870 A1* | 11/2007 | Nissan | H04L 29/06027 713/150 |
| 2010/0098407 A1* | 4/2010 | Goswami | H04B 10/032 398/5 |
| 2012/0177035 A1* | 7/2012 | Sharma | G06F 13/4063 370/355 |
| 2014/0178067 A1* | 6/2014 | Cheng | H04Q 11/0067 398/45 |

* cited by examiner

VERIFYING RUNTIME SWITCH-OVER BETWEEN MULTIPLE I/O PROTOCOLS ON SHARED I/O CONNECTION

BACKGROUND

Embodiments of the present disclosure generally relate to the field of computer networks.

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis. In addition, multiple switches may also be combined to create a distributed network switch.

BRIEF SUMMARY

Embodiments of the present disclosure provide a computer-implemented method for a method for verifying a switch unit. The method includes detecting a runtime switch-over of a switch unit from communicating on a port according to a first protocol to communicating according to a second protocol. The method further includes quiescing traffic of the first protocol from a first protocol driver through the switch unit, and starting traffic of the second protocol from a second protocol driver through the switch unit. The method includes verifying operation of the switch unit in response to the traffic of the second protocol based on compliance with the second protocol.

Embodiments of the present disclosure further provide a computer program product for verifying a device under test. The computer program product includes a computer-readable storage medium having computer-readable program code embodied therewith. The computer-readable program code includes computer-readable program code configured to detect a runtime switch-over of a switch unit from communicating on a port according to a first protocol to communicating according to a second protocol. The computer-readable program code further includes computer-readable program code configured to quiesce traffic of the first protocol from a first protocol driver through the switch unit, and computer-readable program code configured to start traffic of the second protocol from a second protocol driver through the switch unit. The computer-readable program code includes computer-readable program code configured to verify operation of the switch unit in response to the traffic of the second protocol based on compliance with the second protocol.

Embodiments of the present disclosure further provide a system having a cable connect configured to be coupled to a switch unit by a physical connection, a switch-over detector, and a switch-over controller. The switch-over detector is configured to detect a runtime switch-over of the switch unit from communicating on the physical connection according to a first protocol to communicating on the physical connection according to a second protocol. The switch-over controller is configured to, responsive to detecting the runtime switch-over, quiesce traffic of the first protocol from a first protocol driver through the switch unit, and start traffic of the second protocol from a second protocol driver through the switch unit.

BRIEF DESCRIPTION OF THE SEVERAL VIEWS OF THE DRAWINGS

So that the manner in which the above recited aspects are attained and can be understood in detail, a more particular description of embodiments of the present disclosure, briefly summarized above, may be had by reference to the appended drawings.

It is to be noted, however, that the appended drawings illustrate only typical embodiments of this present disclosure and are therefore not to be considered limiting of its scope, for the present disclosure may admit to other equally effective embodiments.

Figure 1:
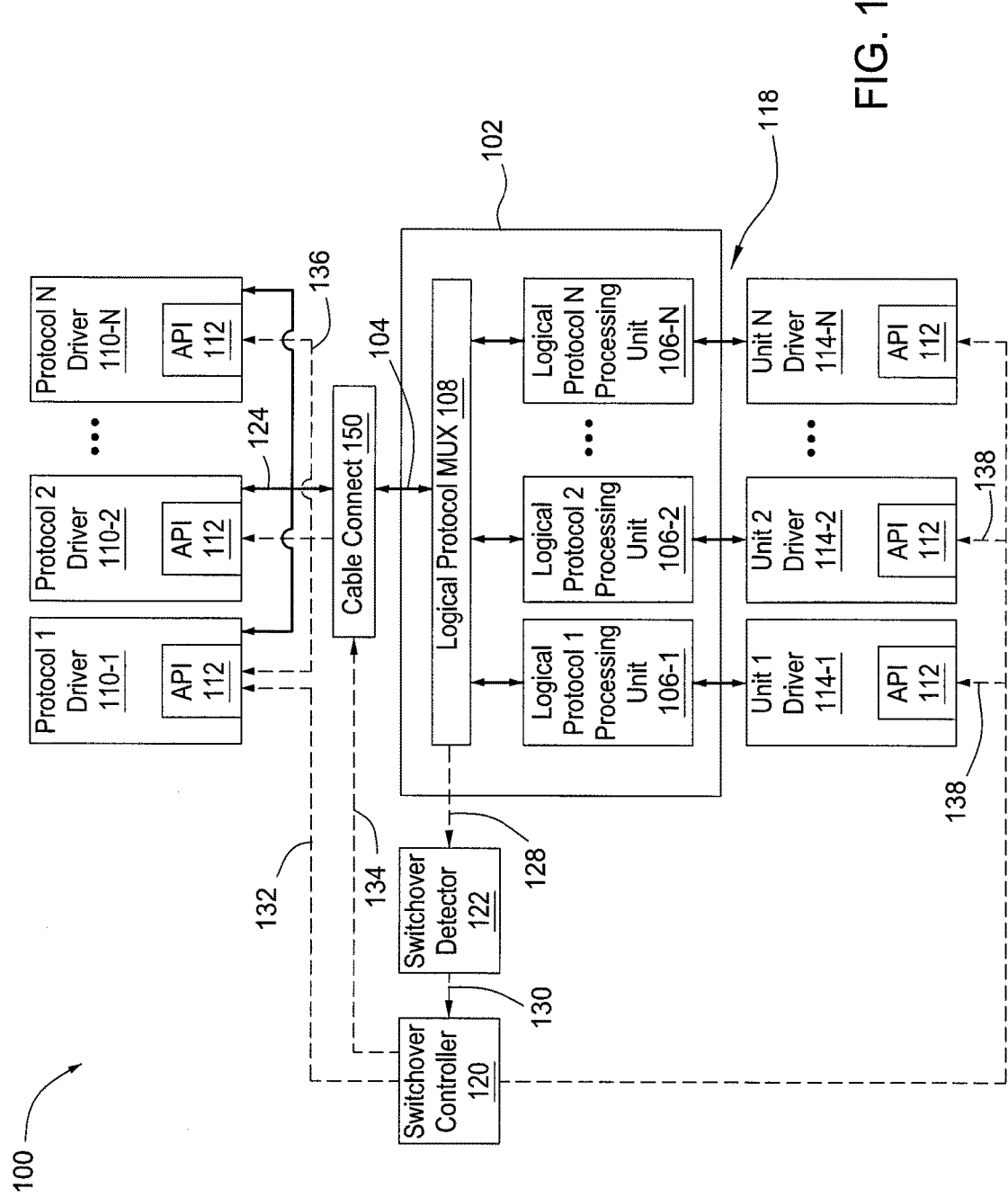
FIG. 1 is a block diagram depicting a verification environment configured to verify communication, interface, and I/O protocols of a switch unit, according to one embodiment of the present disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Embodiments disclosed herein provide techniques to verify run-time switchover between multiple I/O protocols that share the same physical interface. Physical I/O connections can be limited on processor and I/O chips, and therefore, it may be desirable to share physical connections between multiple I/O protocols. As known in the field of chip design, such processor and I/O chips may need to be verified for logical correctness before being sent to foundry. Accordingly, it may be desirable to verify run-time switch-over between the multiple protocols in I/O chips that are intended to support hot plug or drawer pulls while still remaining active for other I/O connections. This is true for a switch unit embodied as a chip that supports multiple industry standard protocols, such as Peripheral Component Interconnect Express (PCIe), Serial ATA (SATA), and Universal Serial Bus (USB), and next generation PCIE 4.0, as well as proprietary communication I/O protocols.

In the following, reference is made to embodiments of the present disclosure. However, it should be understood that the disclosure is not limited to specific described embodiments. Instead, any combination of the following features and elements, whether related to different embodiments or not, is contemplated to implement and practice aspects of the present disclosure. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

FIG. 1 is a block diagram depicting a verification environment 100 configured to verify communication, interface, and I/O protocols of a switch unit 102, according to one embodiment of the present disclosure. The switch unit 102 is configured to process and route traffic of a plurality of predefined protocols received on one or more ports 104 of the switch unit 102. The switch unit 102 includes a plurality of logical protocol processing units 106 (e.g., 106-1, 106-2, . . . 106-N) are each configured to process traffic for a designated protocol. For example, the logical protocol 1 processing unit 106-1 is configured to process packets according to a first protocol, and the logical protocol 2 processing unit 106-2 is configured to process packets according to second (i.e., different) protocol. Examples of protocols that the logical protocol processing units 106 are configured to support may include Peripheral Component Interconnect Express (PCIe), Serial ATA (SATA), Universal Serial Bus (USB), other communication, I/O, or interface protocols, standardized or proprietary protocols.

The logical protocol processing units 106 may parse traffic data (e.g., packets) according to formats and data alignments defined in the specification of the respective protocol, perform checksum calculations, disassemble and re-assemble packets, decide where to forward packets, filter traffic, generate acknowledgements, and perform other processing tasks as specified by the respective protocol. In one embodiment, the logical protocol processing units 106 may be configured to generate packets that go out over a switch unit interface 118 of the switch unit 102 to a proprietary network (e.g., a switching layer accessed by other switch units.) The packets for the switch unit interface 118 may be assembled and/or re-packaged from I/O protocol traffic data received based on the ports 104.

In one or more embodiments, the switch unit 102 receives traffic of multiple I/O protocols on one or more ports 104 that share a same physical I/O connection. The switch unit 102 is configured to switch over from a mode that handles traffic of one protocol (e.g., PCIe) to a mode that handles traffic of a different protocol(s). This switch over capability is represented in FIG. 1 by a logical multiplexor (identified as logical protocol MUX 108), which is communicatively coupled to the logical protocol processing units 106 and configured to change state and switch between the logical protocol processing units 106.

In one implementation, the switch unit 102 may be a system-on-chip (SoC), application-specific integrated circuit (ASIC), integrated circuit (IC), microcontroller, or other hardware element, and the logical protocol processing units 106 and logical protocol multiplexor 108 may be a combination of hardware logic and software drivers within the switch unit 102 configured to provide the functionality described above. In another implementation, the logical protocol processing units 106 and logical protocol multiplexor 108 may be embodied in executable program code or in programmable logic devices that simulate operation of hardware logic and software drivers that provide the described functionality. Such executable program code and programmable logic devices may be used to prototype, simulate, and test the logical protocol processing units 106 and logical protocol multiplexor 108 prior to being embodied in hardware, e.g., before being sent to foundry.

In one embodiment, the verification environment 100 includes a plurality of protocol drivers 110 communicatively coupled to the device under test (e.g., switch unit 102) by a cable connect 150, which is a hardware element coupled by a physical connection to the switch unit 102, and one or more unit drivers 114 communicatively coupled to the interface 118 of the switch unit 102. The verification environment 100 further includes a switch-over controller 120 and a switch-over detector 122 communicatively coupled to the switch unit 102 undergoing verification. Though not shown, it should be noted that the verification environment 100 includes monitor and checker modules which compare the states and output of the switch unit 102 with expected results, and a verification manager that manages and coordinates operation of all of the components described herein together.

In one embodiment, the plurality of protocol drivers 110 (e.g., 110-1, 110-2, . . . 110-N) are configured to generate and drive traffic 124 as defined by one or more I/O protocols to the switch unit 102. The traffic 124 from the protocol drivers 110 may be used to verify that the switch unit 102 operates in conformity with the protocols, that is, check for differences between the specification of the protocols and the implementation of the logical protocol processing units 106. The protocol drivers 110 may include a multitude of test cases defined in the protocol's specification, inputs manually created by a user (e.g., chip designer), random stimulus, and other inputs designed to test the switch unit 102. As shown in FIG. 1, each protocol driver 110 may be configured to generate and drive traffic as defined by a respective protocol. A first protocol driver 110-1 is configured to drive traffic according to a first protocol (Protocol 1), a second protocol driver 110-2 is configured to drive traffic according to a second protocol (Protocol 2), and so forth. By way of example, the first protocol driver 110-1 may be a PCIe protocol driver configured to generate PCIe traffic that, in some test cases, emulates a PCIe device on a PCIe network connected to the switch unit 102.

The unit drivers 114 (e.g., 114-1, 114-2, . . . 114-N) correspond to the logical protocol processing units 106 and are configured to generate and drive input that simulates internal traffic from a proprietary network of other switch units, for example, as described later in conjunction with FIGS. 4 and 5.

In one or more embodiments, each protocol driver 110 and unit driver 114 may include a switch-over driver application programming interface (API) 112 that specifies a set of functions in common that the respective driver may perform to facilitate runtime switch-over verification of the switch unit 102 according to techniques described herein. In one embodiment, the API 112 of a particular protocol driver may provide another (invoking) component the ability to quiesce traffic from the protocol driver, the ability to initiate one or more protocol-specific sequences, and the ability to re-start traffic from the protocol driver.

In one embodiment, the switch-over detector 122 is configured to monitor the logical state of the switch unit 102 (depicted by arrow 128) to determine when a switch-over sequence has started and when a switch-over sequence has ended. In embodiments where the switch unit 102 is embodied by a hardware processing element (e.g., a chip), the switch-over detector 122 may monitor register elements and other hardware elements within the hardware processing unit. In other embodiments where the switch unit 102 is embodied as program code that simulates hardware logic, the switch-over detector 122 may monitor data structures that indicate a logical state of the switch unit 102 to determine when switch-over sequences has started and ended. The switch-over detector 122 may be configured to access the logical state of the switch unit 102 to determine other switch-over state information, such as the current I/O protocol, settings of the one or more ports 104 (e.g., uplink, downlink), and error state information. The switch-over detector 122 may generate events (depicted by arrow 130) indicating a switch-over sequence has started or ended, and provide the switch-over state information to the switch-over controller 120.

In one embodiment, the switch-over controller 120 is configured to control the switch-over sequence by capturing events from the switch-over detector 122 and responding to such events by directing the protocol drivers 110, as well as the unit drivers 114, through invocation of the switch-over driver APIs 112 of the respective drivers. Using the switch-over driver APIs 112, the switch-over controller 120 may quiesce traffic from all or specific protocol drivers 110 and unit drivers 114, initiate one or more protocol-specific sequences, and re-start traffic from all or specific protocol drivers 110 and unit drivers 114 in the verification environment 100. In one embodiment, the API 112 can be interfaced via a software API as used by a software component, for example, a verification test bench, embodied in a program code, such as C++ or SystemVerilog. For example, the switch-over controller 120 may directly control a protocol driver 110-1 via a software API call of the API 112 (as shown by arrows 132, 138 in FIG. 1). In another embodiment, the API 112 can be interfaced via a hardware API (as shown by arrow 134) to allow intermediate routing, for example, pass through the cable connect 150 (as shown by arrow 136).

While components of the verification environment 100 (e.g., protocol drivers 110, unit drivers 114, logical protocol processing units 106) are depicted in FIG. 1 as separate logical entities, it is noted that in other embodiments the components of the verification environment 100 may be combined and separated in other arrangements and configurations, including having one or more shared sub-components (e.g., a parser). As FIG. 1 depicts a generalized embodiment having N logical protocols sharing a physical interface, any number of multiple protocols may be utilized according to the techniques described herein. Further, while FIG. 1 depicts a single set of a switch-over controller and a switch-over detector associated with the port 104, it should be noted that other embodiments may include additional switch-over controllers and switch-over detectors corresponding to additional ports, as described later in conjunction with FIG. 3.

Figure 2:
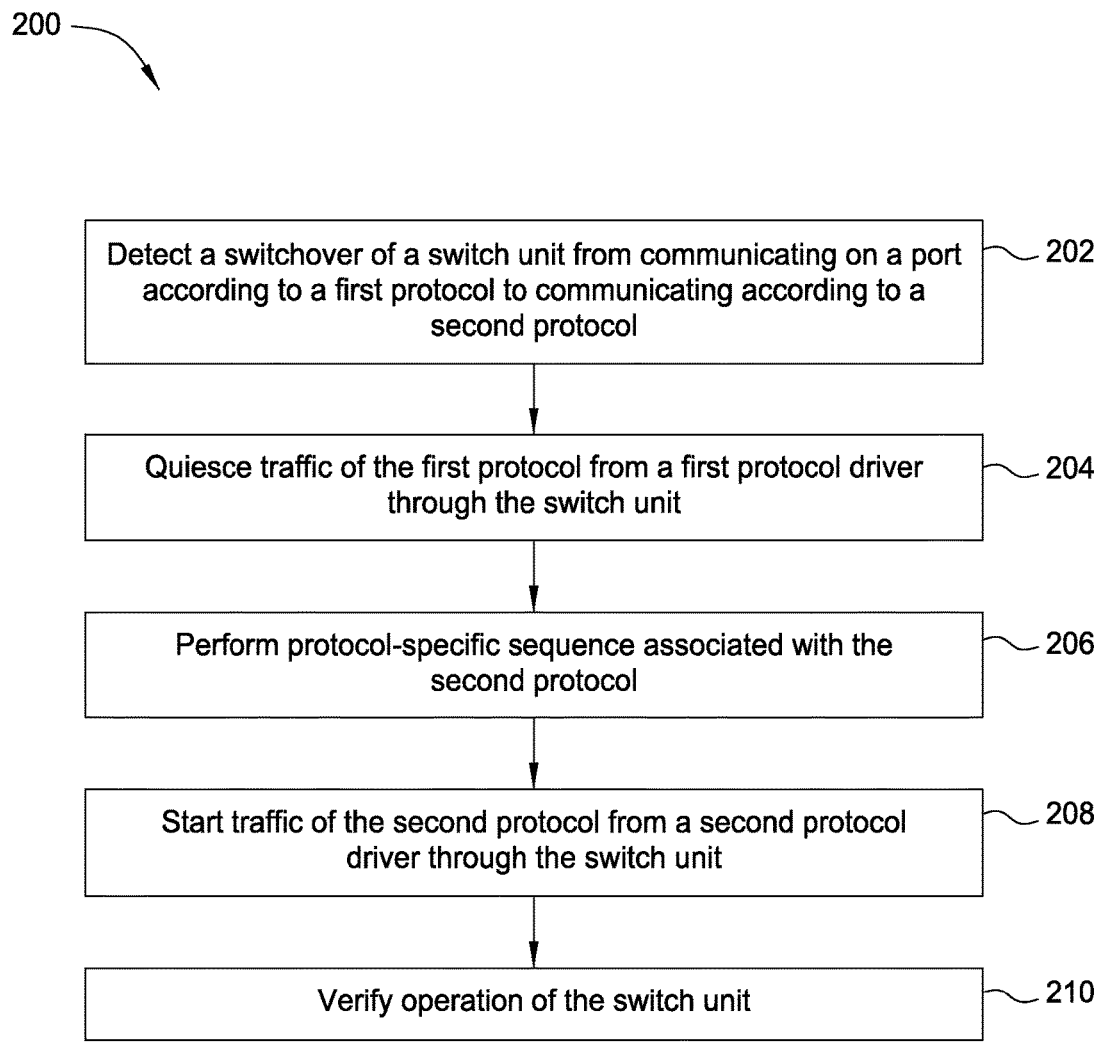
FIG. 2 is a flow diagram depicting a method for verifying a runtime switch-over between multiple logical I/O protocols sharing a same physical I/O, according to one embodiment of the present disclosure.

FIG. 2 is a flow diagram depicting a method 200 for verifying a runtime switch-over between multiple logical I/O protocols sharing a same physical I/O, according to one embodiment of the present disclosure. While the method 200 is described in conjunction with FIG. 3, which is a block diagram depicting one exemplary verification environment 300 configured to verify I/O protocols of a switch unit 302, it should be noted that the method 200 may be performed in other systems and other embodiments of a verification environment according to aspects of the present disclosure.

Figure 3:
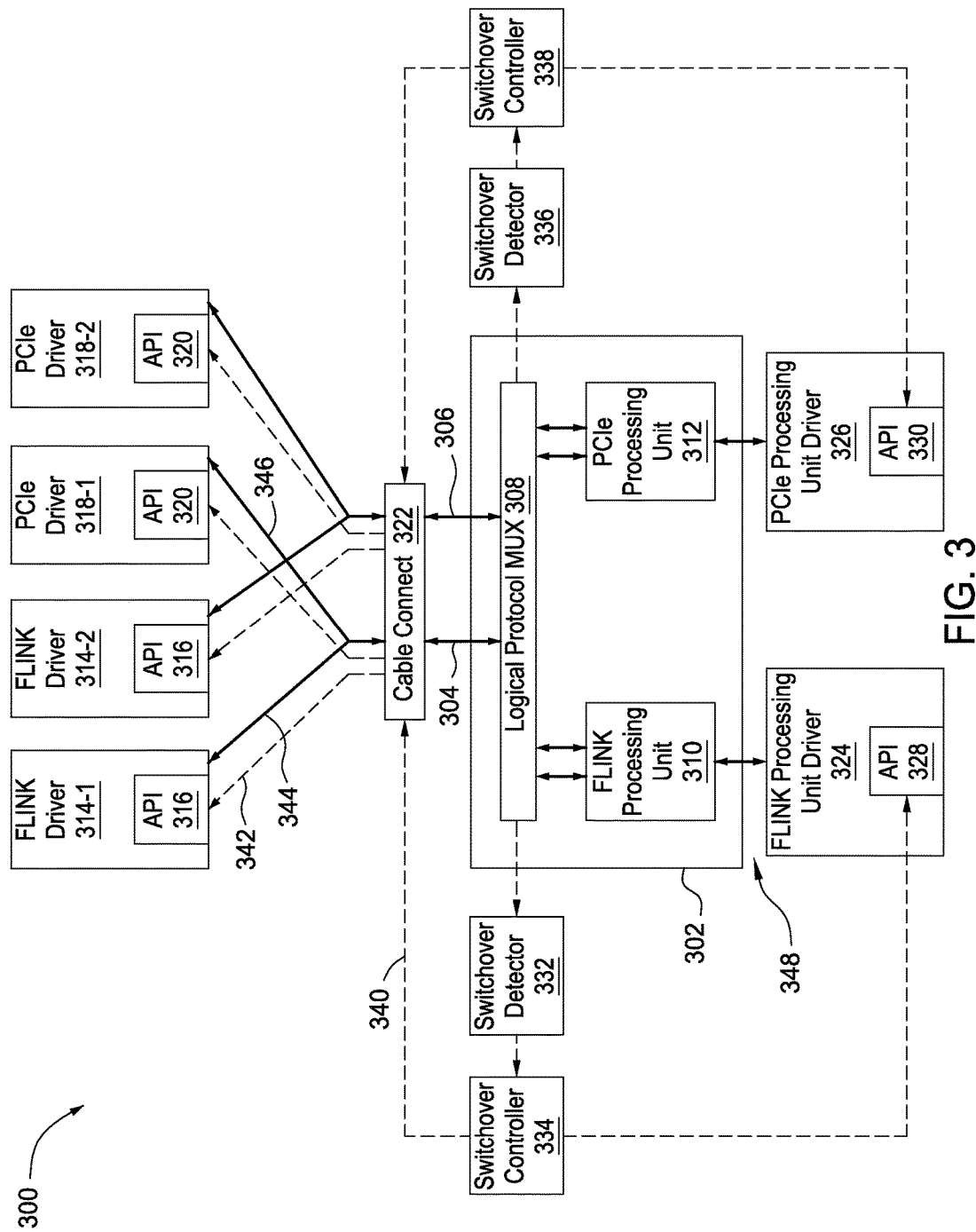
FIG. 3 is a block diagram depicting one exemplary verification environment configured to verify I/O protocols of a switch unit, according to embodiments of the present disclosure.

In the example shown in FIG. 3, a switch unit 302 is communicatively coupled to the verification environment 300 by a first port 304 and a second port 306. The switch unit 302 includes a PCIe processing unit 312 configured to process PCIe traffic, and a logical protocol processing unit 310 configured to process traffic according to a proprietary communications protocol, depicted as "FLINK," and represented as a FLINK processing unit 310, received on the ports 304, 306. The switch unit further includes a logical protocol multiplexor 308 configured to switch operating states of the switch unit 302 between processing FLINK traffic (e.g., via FLINK processing unit 310) and processing PCIe traffic (e.g., via PCIe processing unit 312) received on the ports 304, 306. By way of example, the switch unit 302 may configure the first port 304 for running FLINK traffic, and the second port 306 for running FLINK traffic, although it should be noted the ports may run different traffic in concurrently. A FLINK driver 314-1 of the verification environment 300 emulates an FLINK interface and drives FLINK traffic 344 for testing and verification purposes onto the port 304 of the switch unit 302 via a cable connect 322.

Referring back to FIG. 2, the method 200 begins at step 202, where a switch-over detector detects a runtime switch-over of a switch unit from a communicating on a physical connection according to a first protocol to communicating on the physical connection according to a second protocol. The switch-over may be characterized as a "runtime" switch-over in that the switch unit switches to using a different protocol without having to reset, restart, power cycle, or significantly disrupt service of the switch unit.

In one example, a switch-over detector 332 communicatively coupled to the switch unit 302 detects a switch-over of the switch unit 302 from communicating on the first port 304 according to the FLINK protocol to communicating on the port according to the PCIe protocol. In one embodiment, the switch-over detector 332 may detect a change in the state of the logical protocol multiplexor 308 indicating a different protocol processing unit has been selected. The switch-over detector 332 may generate an event indicating a switch-over sequence for port 304 has been started. In some embodiments, the event generated by the switch-over detector 332 may include state information obtain from the switch unit. A switch-over controller 334 associated with the port 304 captures the event generated by the switch-over detector 332 and coordinates operations of other components in the verification environment 300 responsive to the switch-over event.

At step 204, responsive to detecting the switch-over, a switch-over controller quiesces traffic of the first protocol from a first protocol through the switch unit. For example, the switch-over controller 334 quiesces FLINK traffic coming from the FLINK driver 314-1 via invocation of a switch-over driver API 316 provided by the FLINK driver 314-1. In the embodiment shown, the switch-over controller 334 interfaces with the switch-over driver API 316 by setting a hardware signal 340 at the cable connect 322, which in turn routes that information (i.e., via signal 342) on a hardware interface to the FLINK driver 314-1 to quiesce FLINK traffic to the port 304. In another embodiment, the switch-over controller 334 interfaces with the switch-over driver API 316 of the FLINK driver 314-1 by invoking a software API through software inter-process communication (IPC) mechanisms (e.g., sockets, message passing).

At step 206, the switch-over controller may optionally perform one or more protocol-specific sequences associated with the second protocol and/or associated with the first protocol. In some embodiments, the switch-over controller initiates a sequence of operations specific to the second protocol that initializes communications between a second protocol driver and the port of the switch unit. For example, the switch-over controller 334 may initiate (e.g., via API 320 of PCIe driver 318-1) a PCIe link training sequence that negotiates link parameters (e.g., PCIe lane polarity, link number, set of PCIe lanes that belong to the link, link speed, etc.), as specified by the PCIe protocol, to establish a PCIe link between the PCIe driver 318-1 and the port 304 of the switch unit 302. In another example, the switch-over controller 334 may assert or de-assert a reset signal that wakes up the PCIe driver 318-1, for example, a "PERST" signal, as specified by the PCIe protocol, after which the PCIe driver 318-1 proceeds to link training and initialization.

At step 208, the switch-over controller starts traffic of the second protocol from the second protocol driver through the switch unit. For example, the switch-over controller 334 signals the PCIe driver 318-1 (e.g., via API 320) to start driving PCIe traffic 346 on the first port 304 for testing and verification purposes. It is noted that it may take some time for the switch unit 302 to switch over and prepare itself for handling PCIe traffic. As such, in one embodiment, the switch-over detector 332 may detect that the switch-over sequence occurring within the switch unit 302 has ended, and generate an event indicating such. The switch-over controller 334 captures the event, and responsive to determining the switch-over sequence of the switch unit has ended (i.e., the switch unit is ready), restarts PCIe traffic 346 to the switch unit. In another embodiment, the switch-over controller 334 restarts PCIe traffic 346 to the switch unit responsive to both capturing the event indicating the switch-over sequence of the switch unit has ended and determining that link initialization sequences have been completed (e.g., in step 206) and the link is up.

At step 210, the verification environment verifies operation of the switch unit in response to the traffic of the second protocol based on compliance with the second protocol. In some embodiments, one or more monitor and checker modules compare the internal states of the logical protocol processing units of the switch unit 102 with expected results according to a specification of the second protocol. The monitor and checker modules may compare output from the logical protocol processing units (e.g., outbound traffic from the switch unit) in response to traffic of the second protocol to determine compliance with the second protocol.

In one embodiment, responsive to determining a switch-over has occurred in the switch unit 302, the switch-over controller 334 may modify operations of a protocol processing unit driver communicatively coupled to the switch unit. For example, responsive to detecting the runtime switch-over, the switch-over controller 334 may notify a FLINK processing unit driver 324 and PCIe processing unit driver 326 via switch-over driver APIs 328, 330, respectively. Similar to the unit drivers 114 in FIG. 1, the FLINK processing unit driver 324 and PCIe processing unit driver 326 are unit drivers communicatively coupled to an interface 348 of the switch unit 302 and are configured to drive input that simulates internal traffic from a proprietary network of other switch units. In one embodiment, the switch-over controller 334 may instruct the FLINK processing unit driver 324 to pause generating inputs to the FLINK processing unit 310 and then instruct the PCIe processing unit driver 326 to start generating inputs to the PCIe processing unit 312.

In the embodiment shown in FIG. 3, the verification environment 300 includes an additional switch-over detector 336 and switch-over controller 338 associated with the second port 306. In some embodiments, each port of the switch unit 302 may have respective of a switch-over detector and switch-over controller responsible for detecting switch-overs on that port and transmitting control signals to the verification environment 300. In the embodiment shown, the verification environment 300 includes additional instances of protocol drivers associated with driving traffic on the second port 306 of the switch unit 302. For example, the verification environment 300 includes a separate instance of FLINK driver (e.g., 314-2) and a separate instance of PCIe driver (e.g., 318-2) configured to drive traffic on the second port 306.

Example Distributed Network Switch

Figure 4:
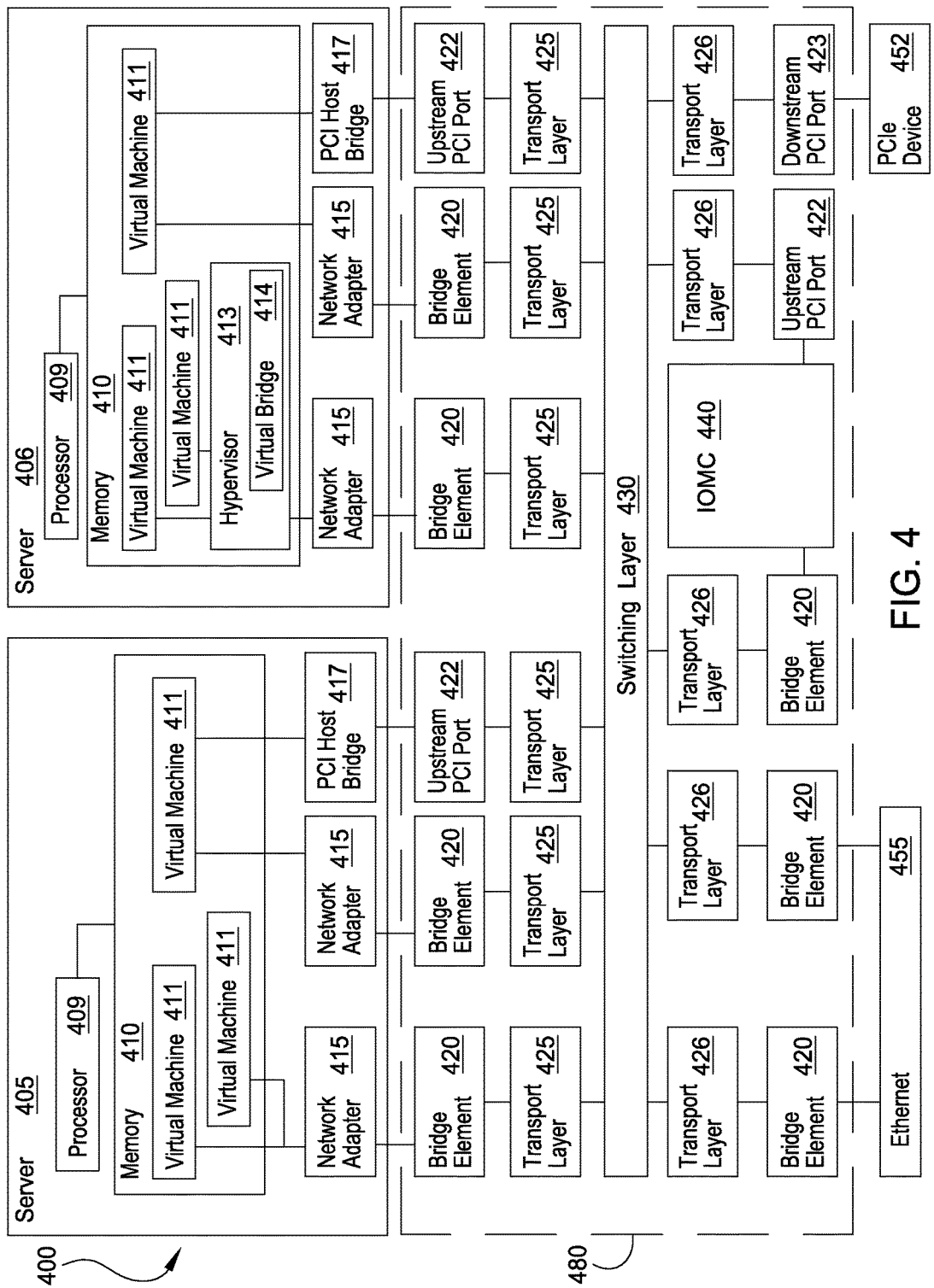
FIG. 4 illustrates a system architecture that includes a distributed network switch, according to one embodiment described herein.

FIG. 4 illustrates a system architecture 400 that includes a distributed network switch 480, according to one embodiment described herein. The computing system 400 includes first and second servers 405, 406 connected to the distributed network switch 480. In one embodiment, the first server 405 may include at least one processor 409 coupled to a memory 410. The processor 409 may represent one or more processors (e.g., microprocessors) or multi-core processors. The memory 410 may represent random access memory (RAM) devices comprising the main storage of the server 405, as well as supplemental levels of memory, e.g., cache memories, non-volatile or backup memories (e.g., programmable or flash memories), read-only memories, and the like. In addition, the memory 410 may include memory storage physically located in the server 405 or on another computing device coupled to the server 405. The server 405 may operate under the control of an operating system (not shown) and execute various computer software applications, components, programs, objects, modules, and data structures, such as virtual machines 411.

The server 405 may include network adapters 415 (e.g., converged network adapters). A converged network adapter may include single root I/O virtualization (SR-IOV) adapters such as a Peripheral Component Interconnect Express (PCIe) adapter that supports Converged Enhanced Ethernet (CEE). Another embodiment of the system 400 may include a multi-root I/O virtualization (MR-IOV) adapter. The network adapters 415 may further be used to implement of Fiber Channel over Ethernet (FCoE) protocol, RDMA over Ethernet, Internet small computer system interface (iSCSI), and the like. In general, a network adapter 415 transfers data using an Ethernet or PCI based communication method and may be coupled to one or more of the virtual machines. Additionally, the adapters may facilitate shared access between the virtual machines. While the adapters 415 are shown as being included within the server 405, in other embodiments, the adapters may be physically distinct devices that are separate from the server 405.

As shown in FIG. 4, the second server 406 may include a processor 409 coupled to a memory 410 which includes one or more virtual machines 411 similar to those found in the first server 405. The memory 410 of server 406 may include a hypervisor 413 configured to manage data shared between different virtual machines 411. The hypervisor 413 may include a virtual bridge 414 that allows direct communication between connected virtual machines 411 rather than requiring the virtual machines 411 to use the bridge elements 420 or switching layer 430 to transmit data to other virtual machines 411 communicatively coupled to the hypervisor 413.

Each network adapter 415 may include one or more Ethernet ports that couple to one of the bridge elements 420. Additionally, to facilitate PCIe communication, the server may have a PCI host bridge 417. The PCI host bridge 417 would then connect to an upstream PCI port 422 on a switch element in the distributed network switch 480. The data is then routed via the switching layer 430 to the correct downstream PCI port 423 which may be located on the same or different switch module as the upstream PCI port 422. The data may then be forwarded to the PCI device 452.

The bridge elements 420 may be configured to forward data frames throughout the distributed network switch 480. For example, a network adapter 415 and bridge element 420 may be connected using two 40 Gbit Ethernet connections or one 100 Gbit Ethernet connection. The bridge elements 420 forward the data frames received by the network adapter 415 through the switching layer 430. The bridge elements 420 may include a lookup table that stores address data used to forward the received data frames. For example, the bridge elements 420 may compare address data associated with a received data frame to the address data stored within the lookup table. Thus, the network adapters 415 do not need to know the network topology of the distributed network switch 480.

The distributed network switch 480, in general, includes a plurality of bridge elements 420 that may be located on a plurality of a separate, though interconnected, hardware components. To the perspective of the network adapters 415, the distributed network switch 480 acts like one single switch even though the distributed network switch 480 may be composed of multiple switches that are physically located on different components. Distributing the distributed network switch 480 provides redundancy in case of failure.

Each of the bridge elements 420 may be connected to one or more transport layer modules 425 that translate received data frames to the protocol used by the switching layer 430. For example, the transport layer modules 425 may translate data received using either an Ethernet or PCI communication method to a generic data type (i.e., a cell) that is transmitted via the switching layer 430 (i.e., a cell fabric). Thus, the switch modules comprising the distributed network switch 480 are compatible with at least two different communication protocols—e.g., the Ethernet and PCIe communication standards. That is, at least one switch module has the necessary logic to transfer different types of data on the same switching layer 430.

In one embodiment, the switching layer 430 may comprise a local rack interconnect (LRI) which connects bridge elements 420 located within the same chassis and rack, as well as links that connect to bridge elements 420 in other chassis and racks. After routing the cells, the switching layer 430 may communicate with transport layer modules 426 that translate the cells back to data frames that correspond to their respective communication protocols. A portion of the bridge elements 420 may facilitate communication with an Ethernet network 455 which provides access to a LAN or WAN (e.g., the Internet). Moreover, PCI data may be routed to a downstream PCI port 423 that connects to a PCIe device 452. The PCIe device 452 may be a passive backplane interconnect, as an expansion card interface for add-in boards, or common storage that can be accessed by any of the servers connected to the distributed network switch 480. Although "upstream" and "downstream" are used to describe the PCI ports, this is only used to illustrate one possible data flow. For example, the downstream PCI port 423 may in one embodiment transmit data from the connected to the PCIe device 452 to the upstream PCI port 422. Thus, the PCI ports 422, 423 may both transmit as well as receive data.

An Input/Output Management Controller (IOMC) 440 (i.e., a special-purpose processor) is coupled to at least one bridge element 420 or upstream PCI port 422 which provides the IOMC 440 with access to the switching layer 430. One function of the IOMC 440 may be to receive commands from an administrator to configure the different hardware elements of the distributed network switch 480. In one embodiment, these commands may be received from a separate switching network from the switching layer 430. Although one IOMC 440 is shown, the system 400 may include a plurality of IOMCs 440. In one embodiment, these IOMCs 440 may be arranged in a hierarchy such that one IOMC 440 is chosen as a master while the others are delegated as members (or slaves). In another embodiment, the IOMCs 440 may be arranged in a peer-to-peer layout where the IOMCs 440 collaborate to administer and manage the elements of the distributed network switch 480.

Figure 5:
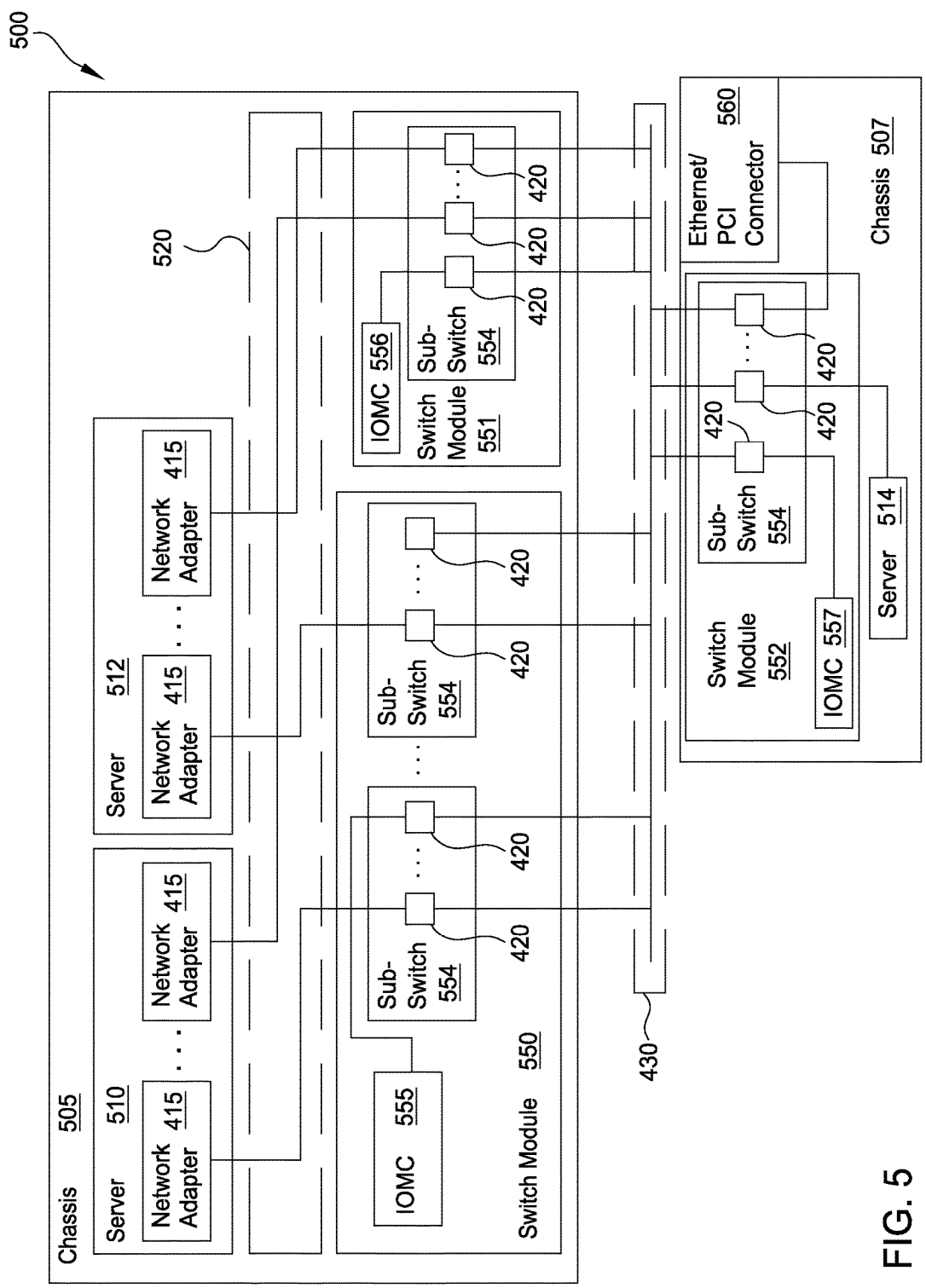
FIG. 5 illustrates a hardware representation of a system that implements a distributed network switch, according to one embodiment of the present disclosure.

FIG. 5 illustrates a hardware level diagram 500 of the system 400, according to one embodiment described herein. Server 510 and 512 may be physically located in the same chassis 505; however, the chassis 505 may include any number of servers. The chassis 505 also includes a plurality of switch modules 550, 551 that include one or more sub-switches 554 (i.e., a microchip). In one embodiment, the switch modules 550, 551, 552 are hardware components (e.g., PCB boards, FPGA boards, etc.) that provide physical support and connectivity between the network adapters 415 and the bridge elements 420. In general, the switch modules 550, 551, 552 include hardware that connects different chassis 505, 507 and servers 510, 512, 514 in the system 500 and may be a single, replaceable part in the computing system.

The switch modules 550, 551, 552 (e.g., a chassis interconnect element) include one or more sub-switches 554 and an IOMC 555, 556, 557. The sub-switches 554 may include a logical or physical grouping of bridge elements 420—e.g., each sub-switch 554 may have five bridge elements 420. Each bridge element 420 may be physically connected to the servers 510, 512. For example, a bridge element 420 may route data sent using either Ethernet or PCI communication protocols to other bridge elements 420 attached to the switching layer 430 using the routing layer. In one embodiment, the bridge element 420 may not be needed to provide connectivity from the network adapter 415 to the switching layer 430 for PCI or PCIe communications.

Each switch module 550, 551, 552 includes an IOMC 555, 556, 557 for managing and configuring the different hardware resources in the system 500. In one embodiment, the respective IOMC for each switch module 550, 551, 552 may be responsible for configuring the hardware resources on the particular switch module. However, because the switch modules are interconnected using the switching layer 430, an IOMC on one switch module may manage hardware resources on a different switch module. As discussed above, the IOMCs 555, 556, 557 are attached to at least one sub-switch 554 (or bridge element 420) in each switch module 550, 551, 552 which enables each IOMC to route commands on the switching layer 430.

The dotted line in chassis 505 defines the midplane 520 between the servers 510, 512 and the switch modules 550, 551. That is, the midplane 520 includes the data paths (e.g., conductive wires or traces) that transmit data between the network adapters 415 and the sub-switches 554.

Each bridge element 420 connects to the switching layer 430 via the routing layer. In addition, a bridge element 420 may also connect to a network adapter 415 or an uplink. As used herein, an uplink port of a bridge element 420 provides a service that expands the connectivity or capabilities of the system 500. As shown in chassis 507, one bridge element 420 includes a connection to an Ethernet or PCI connector 560. For Ethernet communication, the connector 560 may provide the system 500 with access to a LAN or WAN (e.g., the Internet). Alternatively, the port connector 560 may connect the system to a PCIe expansion slot—e.g., PCIe device 452. The PCIe device 452 may be additional storage or memory which each server 510, 512, 514 may access via the switching layer 430. Advantageously, the system 500 provides access to a switching layer 430 that has network devices that are compatible with at least two different communication methods.

According to one embodiment of the present disclosure, each sub-switch 554 may be a switch unit having a plurality of logical protocol processing units, configured similarly to the switch unit 102 described earlier and verified according to techniques described herein. Each sub-switch 554 may be configured to perform a runtime switch-over between multiple I/O protocols sharing a same physical I/O connection. For example, the sub-switch 554 of the switch module 552 may be connected to one or more PCI connector(s) 560 and the server 514 with a shared I/O connection and use multiple I/O protocols, e.g., PCIe, FLINK, with the connected devices. Also in this example, the sub-switch 554 of the switch module 552 is connected by a sub-switch interface to the switching layer 430, which routes data to other sub-switches 554 in other switch modules and/or in other chassis according to a proprietary protocol for traffic within the distributed network switch.

As shown, a server 510, 512, 514 may have a plurality of network adapters 415. This provides redundancy if one of these adapters 415 fails. Additionally, each adapter 415 may be attached via the midplane 520 to a different switch module 550, 551, 552. As illustrated, one adapter of server 510 is communicatively coupled to a bridge element 420 located in switch module 550 while the other adapter is connected to a bridge element 420 in switch module 551. If one of the switch modules 550, 551 fails, the server 510 is still able to access the switching layer 430 via the other switching module. The failed switch module may then be replaced (e.g., hot-swapped) which causes the IOMCs 555, 556, 557 and bridge elements 420 to update the routing tables and lookup tables to include the hardware elements on the new switching module.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the present disclosure may be devised without departing from the basic scope thereof, and the scope thereof is determined by the claims that follow.

What is claimed is:

1. A computer program product for verifying a device under test, the computer program product comprising:
a computer-readable storage medium having computer-readable program code embodied therewith, the computer-readable program code comprising:
computer-readable program code configured to detect a runtime switch-over of a switch unit from communicating on a port according to a first protocol to communicating according to a second protocol;
computer-readable program code configured to quiesce traffic of the first protocol from a first protocol driver through the switch unit;
computer-readable program code configured to start test traffic of the second protocol from a second protocol driver through the switch unit, wherein the second protocol driver is external to the switch unit and generates the test traffic for verifying that the switch unit operates in conformity with the second protocol; and
computer-readable program code configured to verify operation of the switch unit in response to the test traffic of the second protocol from the second protocol driver based on compliance with the second protocol,
wherein the switch unit comprises, or includes a computer-readable program code simulation of, a logical protocol multiplexor, a first logical protocol processing unit associated with the first protocol, and a second logical protocol processing unit associated with the second protocol, and
wherein communications according to the first protocol and communications according to the second protocol share a same interface of the switch unit.

2. The computer program product of claim 1, wherein the computer-readable program code further comprises:
computer-readable program code configured to, prior to the starting the test traffic of the second protocol from the second protocol driver through the switch unit, initiate a protocol-specific sequence associated with the second protocol.

3. The computer program product of claim 1, wherein the computer-readable program code further comprises:
computer-readable program code configured to, responsive to detecting the runtime switch-over of the switch unit, modify operation of a protocol processing unit driver communicatively coupled to the switch unit.

4. The computer program product of claim 1, wherein the computer-readable program code configured to quiesce the traffic of the first protocol from the first protocol driver through the switch unit further comprises:
computer-readable program code configured to invoke an application protocol interface (API) of the first protocol driver to quiesce the traffic of the first protocol.

5. The computer program product of claim 1, wherein the computer-readable program code configured to start the test traffic of the second protocol from the second protocol driver through the switch unit further comprises:
computer-readable program code configured to invoke an application protocol interface (API) of the second protocol driver to restart the test traffic of the second protocol.

6. The computer program product of claim 1, wherein the first protocol and the second protocol are I/O communications protocols selected from the group consisting of: Peripheral Component Interconnect Express (PCIe), Serial ATA (SATA), and Universal Serial Bus (USB).

7. The computer program product of claim 1,
wherein the runtime switch-over of the switch unit is detected based on monitoring of a logical state of the switch unit maintained in a register or data structure, and
wherein verifying operation of the switch unit in response to the test traffic from the second protocol driver includes at least one of comparing internal states of one or more logical processing units of the switch unit to expected results according to a specification of the second protocol or determining whether output from the one or more logical protocol processing units in response to the test traffic from the second protocol driver complies with the second protocol.

8. A system, comprising:
a cable connect configured to be coupled to a switch unit by a physical connection;

a switch-over detector configured to detect a runtime switch-over of the switch unit from communicating on the physical connection according to a first protocol to communicating on the physical connection according to a second protocol; and a switch-over controller configured to, responsive to detecting the runtime switch-over, quiesce traffic of the first protocol from a first protocol driver through the switch unit, and start test traffic of the second protocol from a second protocol driver through the switch unit, wherein the second protocol driver is external to the switch unit and generates the test traffic for verifying that the switch unit operates in conformity with the second protocol, wherein the switch unit comprises a logical protocol multiplexor, a first logical protocol processing unit associated with the first protocol, and a second logical protocol processing unit associated with the second protocol, and wherein communications according to the first protocol and communications according to the second protocol share a same interface of the switch unit.

9. The system of claim 8, wherein the switch-over controller is further configured to, prior to the starting the test traffic of the second protocol from the second protocol driver through the switch unit, initiate a protocol-specific sequence associated with the second protocol.

10. The system of claim 8, wherein the switch-over controller is further configured to, responsive to detecting the runtime switch-over of the switch unit, modify operation of a protocol processing unit driver communicatively coupled to the switch unit.

11. The system of claim 8, wherein the switch-over controller is further configured to invoke an application protocol interface (API) of the first protocol driver to quiesce the traffic of the first protocol and invoke an application protocol interface (API) of the second protocol driver to restart the test traffic of the second protocol.

12. The system of claim 8, wherein the first protocol and the second protocol are I/O communications protocols selected from the group consisting of: Peripheral Component Interconnect Express (PCIe), Serial ATA (SATA), and Universal Serial Bus (USB).

13. The system of claim 8, wherein the runtime switch-over of the switch unit is detected based on monitoring of a logical state of the switch unit maintained in a register or data structure, and wherein operation of the switch unit in response to the test traffic from the second protocol driver of the second protocol is verified by at least one of comparing internal states of one or more logical processing units of the switch unit to expected results according to a specification of the second protocol or determining whether output from the one or more logical protocol processing units in response to the test traffic from the second protocol driver complies with the second protocol.

* * * * *